United States Patent [19]
Davis, Jr. et al.

[11] Patent Number: 6,070,983
[45] Date of Patent: Jun. 6, 2000

[54] TWO-TONE MIRROR HOUSING

[75] Inventors: Joseph J. Davis, Jr., Ortonville; Timothy F. O'Brien, White Lake, both of Mich.

[73] Assignee: Lear Automotive Dearborn, Inc., Southfield, Mich.

[21] Appl. No.: 09/174,270

[22] Filed: Oct. 16, 1998

[51] Int. Cl.[7] .................................................. G02B 7/182
[52] U.S. Cl. .......................... 359/871; 359/872; 359/873; 359/874; 359/865
[58] Field of Search ..................................... 359/871, 872, 359/873, 874, 865; 428/323, 335, 423.1

[56] References Cited

U.S. PATENT DOCUMENTS 5,781,353  7/1998  Seubert et al. ........................... 358/841
5,942,324  8/1999  Chu et al. ................................ 428/323

*Primary Examiner*—Cassandra Spyrou
*Assistant Examiner*—Mohammad Y. Sikder
*Attorney, Agent, or Firm*—MacMillan, Sobanski & Todd, LLC

[57] ABSTRACT

A mirror housing is formed of two colors in a two-stage molding process. An inlay of the first color is inserted into a mold, and plastic of a second color is molded to surround the inlay. In this way, a two-toned mirror housing is formed without the necessity of painting or masking.

6 Claims, 1 Drawing Sheet

TWO-TONE MIRROR HOUSING

BACKGROUND OF THE INVENTION

This invention relates to the use of a two-step molding process to develop a two-toned mirror housing.

All vehicles have outside rear-view mirrors mounted for use by the driver. Known rear-view mirrors have a forward reflective face and a housing which receives the reflective face, and any associated motors, etc. The housings are typically colored to blend with the color of the vehicle exterior. However, in some instances, the housing may be of two distinct colors. As an example, in a vehicle with a first predominant body color, but a second trim color, the mirror housings may sometimes desirably include both the predominant body color and the trim color. This type of dual color often requires there be a central location in the outer mirror housing which is of a distinct color. This is known as a "skull cap" in the industry. To date, the skull caps on mirror housings have been created by masking the portions of the mirror housing, and painting unmasked parts to achieve the two distinct colors.

Masking and selective painting are complex operations in large assembly installations. It would be desirable to reduce the complexity of forming a two-toned mirror housing.

It is known to mold parts in successive steps to create distinct colors. However, this technology has not been applied to mirror housings to date.

SUMMARY OF THE INVENTION

In a disclosed embodiment of this invention, a two-stage molding process is utilized to form a two-toned mirror housing. In a first stage, an inlay is created of a first color. The inlay is placed into a mold, and plastic of a second color surrounds the inlay. The second plastic bonds to the inlay and creates the mirror housing.

The mirror housing now has its "skull cap" and no painting or masking is required. The inlay may be first molded in the same mold that is utilized to form the overall housing, or can be molded at a separate location.

The present invention eliminates many of the steps for forming a two-toned mirror housing, and thus provides benefits over the prior art. These and other features of the present invention can be best understood from the following specification and drawings, the following of which is a brief description.

DETAILED DESCRIPTION OF THE PREFERRED EMBODIMENT

Figure 1A:
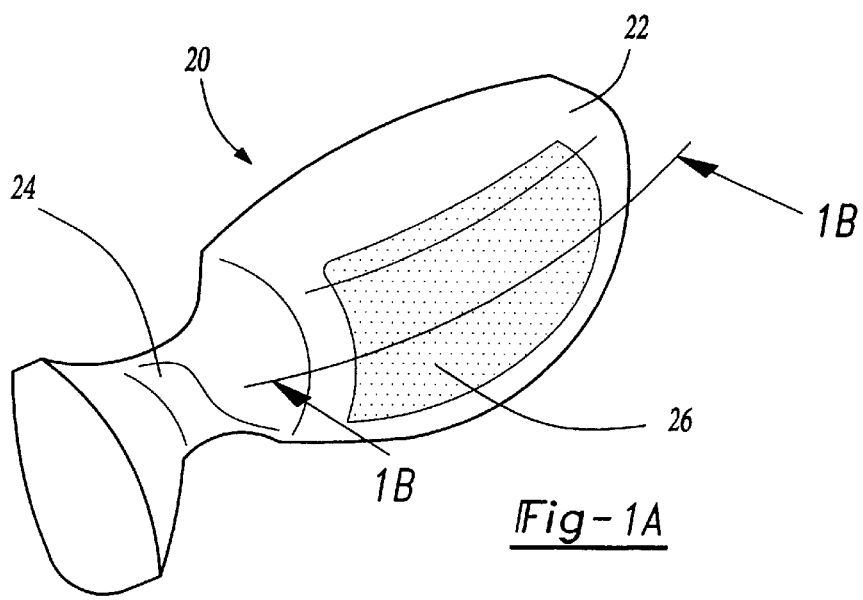
FIG. 1A shows a mirror housing incorporated in the present invention.

A mirror housing 20 is illustrated in FIG. 1A. Mirror housing 20 includes a main outer area 22 associated with a mounting stem 24. A central area 26 is shown separated from the main area 22. It should be understood that FIG. 1A is from the rear of the mirror, and does not show its reflective surface. The reflective surface is facing into the plane of FIG. 1A.

Figure 1B:
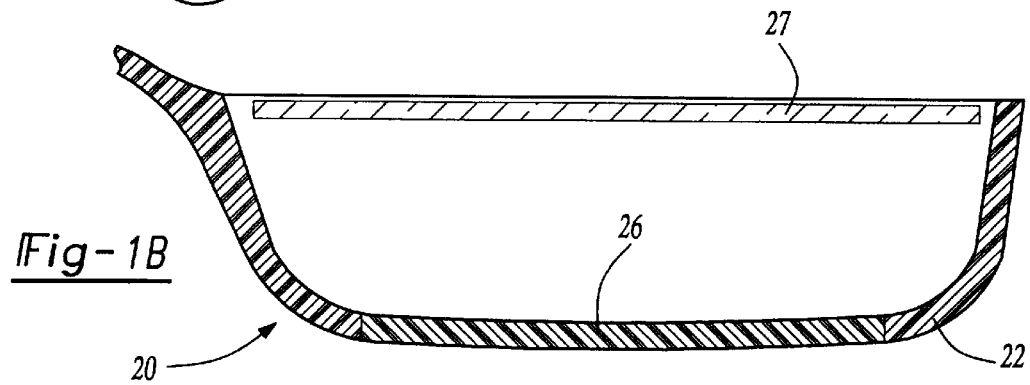
FIG. 1B is a cross-sectional view.

FIG. 1B shows the reflective surface 27 and the areas 22 and 26. Internal structure of the mirror housing is omitted for simplicity.

The plastic areas 22 and 26 are formed of different colored plastic which are molded together to form the housing 20. This reduces the complexity of forming a two-toned mirror housing, as described above.

Figure 2A:
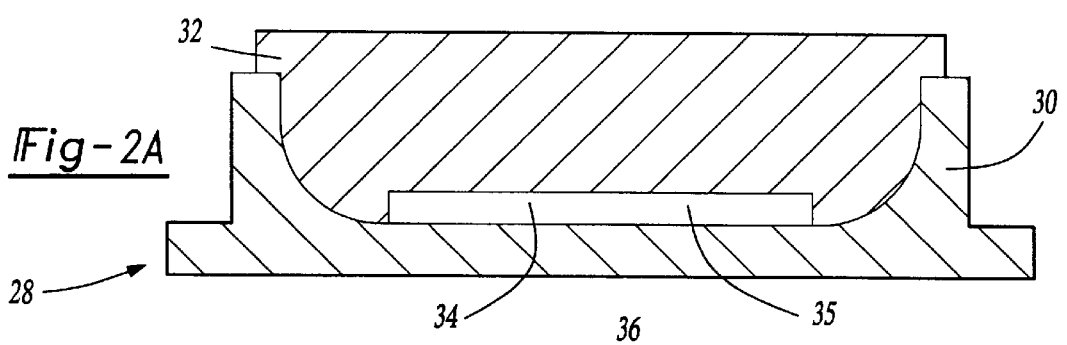
FIG. 2A shows a first step in forming the inventive mirror housing.
Figure 2B:
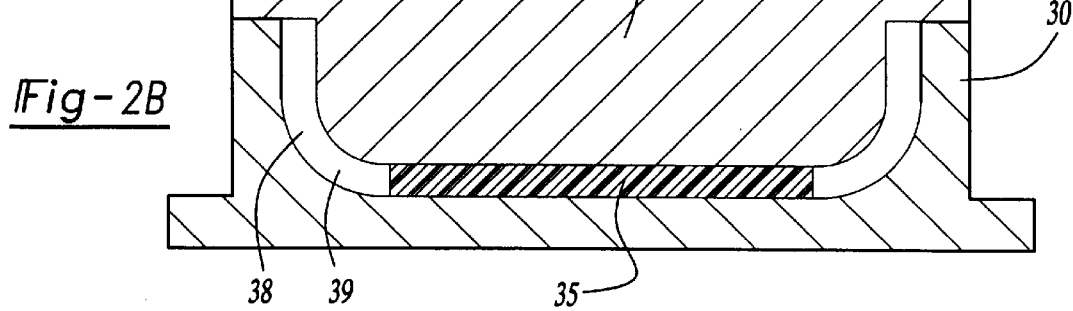
FIG. 2B shows a subsequent step.

One possible method for forming the mirror housing is schematically shown in FIGS. 2A and 2B. It should be understood that many distinct types of two-stage molding techniques are now known, and could also be utilized to form this invention.

As an example, as shown in FIG. 2A, a schematic molding assembly 28 includes a first mold bottom 30 and a mold top 32. The molds 30 and 32 define a mold chamber 34 into which plastic is injected to form an inlay 35.

As shown in FIG. 2B, the mold bottom 30 is then indexed to a second mold station with the inlay 35 remaining in the mold 38. A new top mold 36 then defines a second mold chamber 38 surrounding the inlay 35. The plastic 39 injected into chamber 38 bonds to the inlay 35 to form the mirror housing 20.

By utilizing this invention, the present invention reduces the steps necessary to form a two-color mirror housing. No time consuming and expensive masking or painting is required.

A preferred embodiment of this invention has been disclosed, however, a worker of ordinary skill in the art would recognize that certain modifications come within the scope of this invention. For that reason, the following claims should be studied to determine the true scope and content of this invention.

What is claimed is:

1. A mirror housing comprising:

(1) a mirror housing body formed from a material having a first color; and (2) an inlay molded into said mirror housing body, said inlay being formed from a material having a second color with said second color being different from said first color.

2. A mirror housing as recited in claim 1 wherein a portion of said inlay is visible, such that the mirror housing has a two-tone appearance.

3. A mirror housing as recited in claim 2 wherein said mirror housing body completely surrounds said inlay.

4. A mirror housing as recited in claim 3 wherein said material forming said mirror housing body is a plastic.

5. A mirror housing as recited in claim 4 wherein said material forming said insert is a plastic.

6. A mirror housing as recited in claim 5 wherein said mirror housing body includes a post.

* * * * *